United States Patent
Vancak

(10) Patent No.: US 8,381,715 B2
(45) Date of Patent: Feb. 26, 2013

(54) RADIANT TUBE HEATER ASSEMBLY

(76) Inventor: John Vancak, Calgary (CA)

( * ) Notice: Subject to any disclaimer, the term of this patent is extended or adjusted under 35 U.S.C. 154(b) by 1469 days.

(21) Appl. No.: 11/600,888

(22) Filed: Nov. 17, 2006

(65) Prior Publication Data

US 2008/0115781 A1    May 22, 2008

(51) Int. Cl.
*F23C 3/00* (2006.01)
*F24C 3/04* (2006.01)
*F24H 3/02* (2006.01)
*F24H 3/00* (2006.01)

(52) U.S. Cl. .............. 126/91 A; 126/92 AC; 126/110 B; 126/104 A

(58) Field of Classification Search ................ 126/91 A, 126/92 AC, 110 B
See application file for complete search history.

(56) References Cited

U.S. PATENT DOCUMENTS

| | | | | |
|---|---|---|---|---|
| 3,489,134 A * | 1/1970 | Cowan | ........................ | 126/91 A |
| 4,390,125 A * | 6/1983 | Rozzi | ............................ | 237/70 |
| 5,368,011 A * | 11/1994 | Bodner | ..................... | 126/116 R |
| 5,441,405 A * | 8/1995 | Bedford et al. | ............... | 431/286 |
| 5,546,925 A * | 8/1996 | Knight et al. | ............. | 126/110 R |
| 6,152,128 A * | 11/2000 | Willey et al. | ............... | 126/110 B |
| 6,244,855 B1 * | 6/2001 | Turk et al. | ........................ | 431/12 |
| 6,425,754 B1 * | 7/2002 | Lindskog | .......................... | 431/5 |
| 6,718,968 B2 * | 4/2004 | Cooley et al. | ............. | 126/110 C |
| 7,196,263 B2 * | 3/2007 | Fraas et al. | ..................... | 136/253 |
| 7,328,697 B2 * | 2/2008 | Turner et al. | ................ | 126/91 A |
| 2005/0266362 A1 * | 12/2005 | Stone et al. | .................... | 431/18 |
| 2006/0081238 A1 * | 4/2006 | Vancak | ..................... | 126/92 AC |
| 2008/0178860 A1 * | 7/2008 | Schwank et al. | .......... | 126/104 A |

* cited by examiner

*Primary Examiner* — Steven B McAllister
*Assistant Examiner* — Frances H Kamps
(74) *Attorney, Agent, or Firm* — George A. Seaby

(57) ABSTRACT

A radiant tube heater includes a housing and a burner tube extending outwardly therefrom for carrying products of combustion from the housing. When less heat is required, unless air from the blower is reduced, there is too much air for complete combustion of the fuel and excess air mixes with combustion gases causing cooling in the burner tube. This problem is solved by providing a short flame tube in the inlet end of the burner tube for receiving the flame. Excess air flow around the flame tube is heated. Thus, it is necessary to reduce only the supply of fuel to the burner.

5 Claims, 3 Drawing Sheets

RADIANT TUBE HEATER ASSEMBLY

BACKGROUND OF THE INVENTION

Field of the Invention

This invention relates to a radiant tube heater assembly.

The conventional radiant tube heater includes a housing containing a burner, a burner tube extending out of the housing and a reflector connected to the housing and partially surrounding the burner tube. Gas is introduced into the burner for mixing with air from a blower attached to or mounted in the housing. The gas flows into the housing via an inlet line equipped with a valve. It is necessary to control the flow of gas and air in order to ensure complete combustion of the gas. Otherwise, excess air, i.e. air not required for complete combustion of the fuel enters the burner tube with the flame from the burner and cools the combustion gases immediately downstream of the burner. Thus, when the supply of fuel to the burner is reduced, it is also necessary to decrease the blower fan speed so that less air is fed into the housing.

GENERAL DESCRIPTION OF THE INVENTION

The object of the present invention is to provide a radiant tube heater assembly, which does not require a reduction in air flow when the heat is turned down, i.e. when the flow of gas into the burner is reduced by partly closing the valve in the gas inlet line or by the reduction of fuel pressure in the gas valve and/or gas regulator assembly.

In general terms, the above defined object is achieved by adding a short flame tube in the inlet end of the burner tube so that air not required for complete combustion of the gas flows over the flame tube. During passage over the flame tube, the air is heated and then mixes with the combustion gases downstream of the flame tube. Consequently, the combustion gases are not cooled or are cooled less than in existing burner tubes without a flame tube.

More specifically, the invention relates to a radiant tube heater comprising a housing; an outlet in one end of said housing; a burner tube extending outwardly from said housing around said opening; a burner in said housing; a gas inlet extending into said housing and connected to said burner for introducing fuel into said burner; a blower in said housing for introducing combustion air into the housing for mixing with the fuel and for blowing a flame and the products of combustion into said burner tube; and a flame tube in said burner tube for receiving the flame, whereby air required for efficient combustion of the gas passes through the flame tube, and excess air exiting the housing passes between the burner tube and the flame tube for heating by the flame tube.

DESCRIPTION OF THE PREFERRED EMBODIMENT

Figure 1:
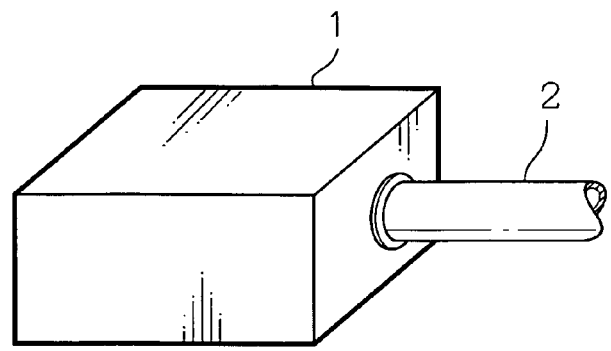
FIG. 1 is an isometric view of one end of a radiant tube heater assembly.
Figure 2:
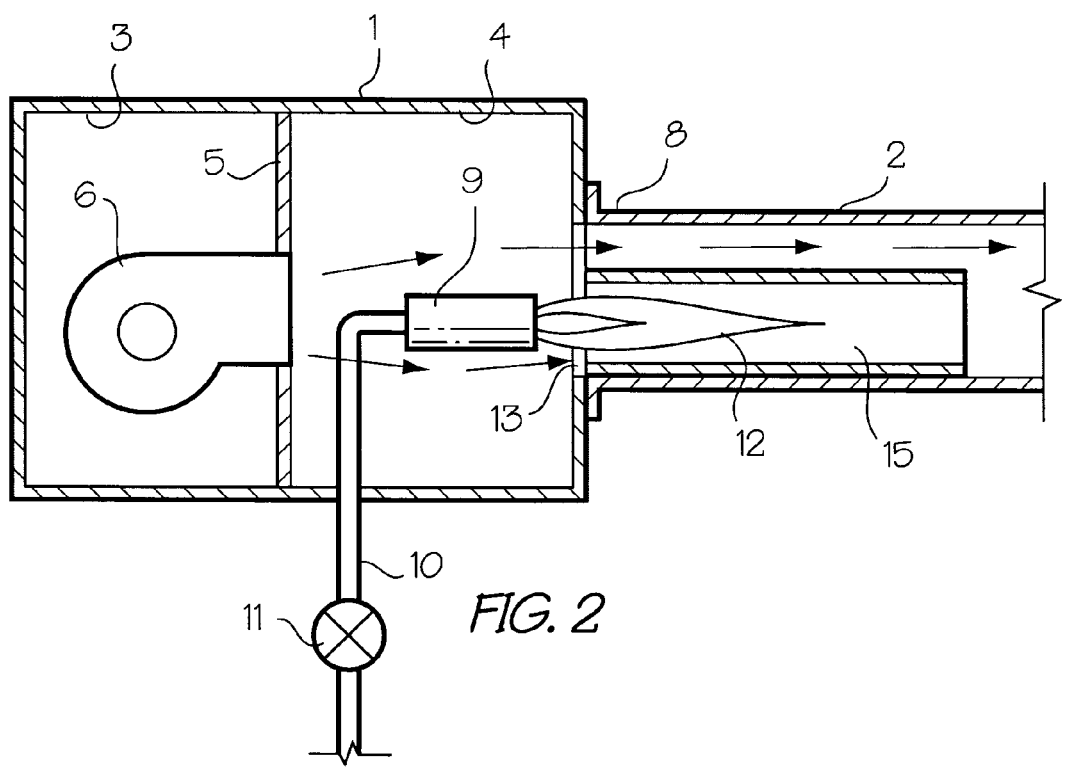
FIG. 2 is a schematic longitudinal sectional view of the end of the heater assembly of FIG. 1 and a flame tube in accordance with the present invention.

Referring to FIGS. 1 and 2, a radiant tube heater assembly includes a housing 1 with a burner tube 2 extending outwardly therefrom. A reflector (not shown) is usually provided around the top and sides of the burner tube 2. The interior of the housing 1 is divided into a pair of chambers 3 and 4 by a partition 5. The chamber 3 contains a blower 6 for introducing combustion air into the chamber 4 and the inlet end 8 of the burner tube 2. Gas is fed into a burner 9 in the chamber 4 via an inlet line 10 containing a valve 11.

In the conventional radiant heater, air from the blower 6 mixes with fuel entering the burner 9 via the tube 10, and the resulting flame 12 projects outwardly through an opening 13 in the housing 1 into the burner tube 8 to heat the latter. When the valve 11 is partially closed to reduce the fuel for combustion which reduces the heat being generated by the radiant heater, it is also necessary to reduce the airflow from the blower 6, i.e. reduce the blower fan speed; otherwise, there is too much air for complete combustion of the fuel. Any excess air entering the inlet end 8 of the burner tube 2 mixes with the combustion gases causing cooling downstream in the burner tube.

Figure 3:
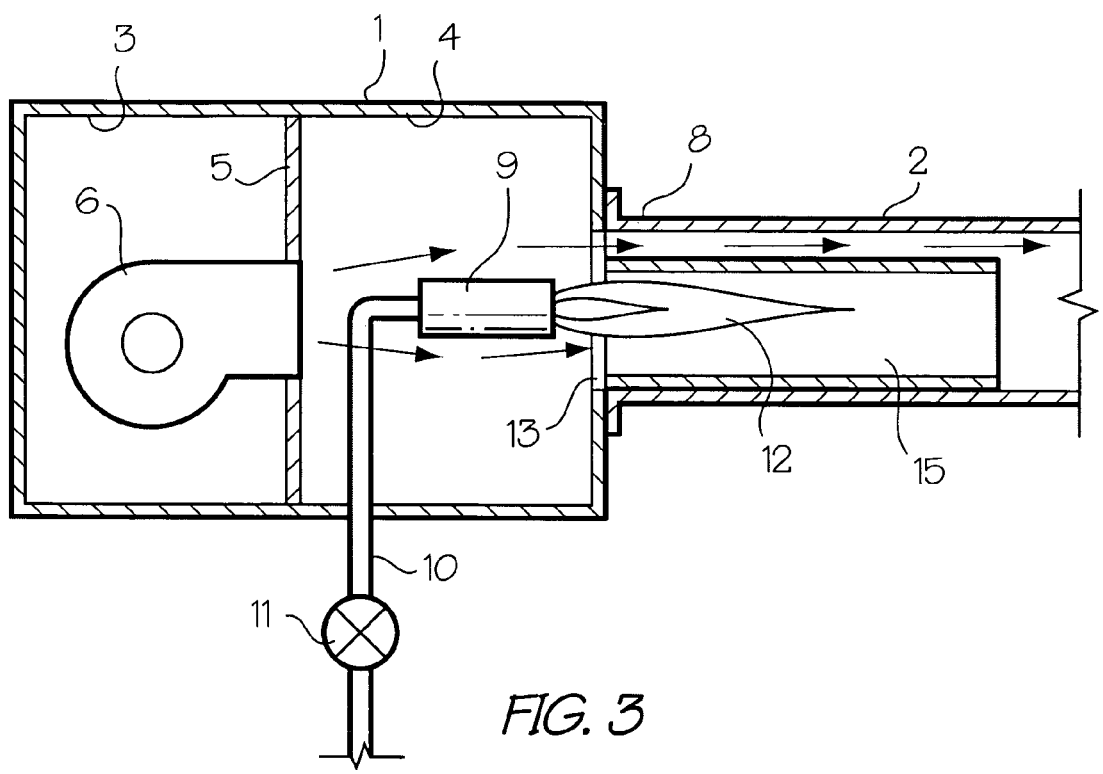
FIG. 3 is a schematic longitudinal sectional view of one end of a heater assembly containing a flame tube in accordance with a second embodiment of the present invention.

In accordance with the present invention, a short flame tube 15 is mounted in the inlet end 8 of the burner tube 2 for receiving the flame 12. As shown in FIG. 2, the flame tube 15 can be spot welded to one side (in this case the bottom) of the burner tube 2. In this first embodiment of the invention the burner 9 is aligned with the longitudinal axis of the flame tube 15. In a second embodiment of the invention (FIG. 3), the burner 9 is centered with respect to the opening 12 in the housing 1 and the longitudinal axis of the burner tube 2.

Figure 4:
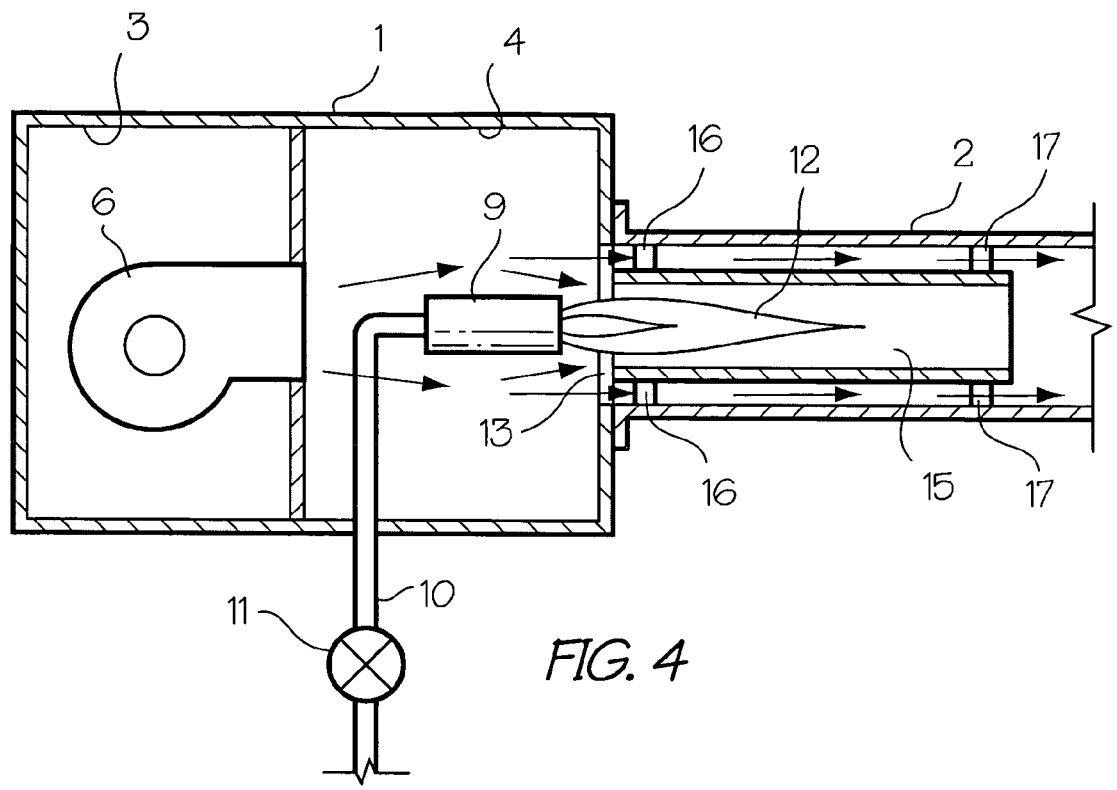
FIG. 4 is a schematic longitudinal sectional view of one end of a heater assembly containing a flame tube in accordance with a third embodiment of the invention.
Figure 5:
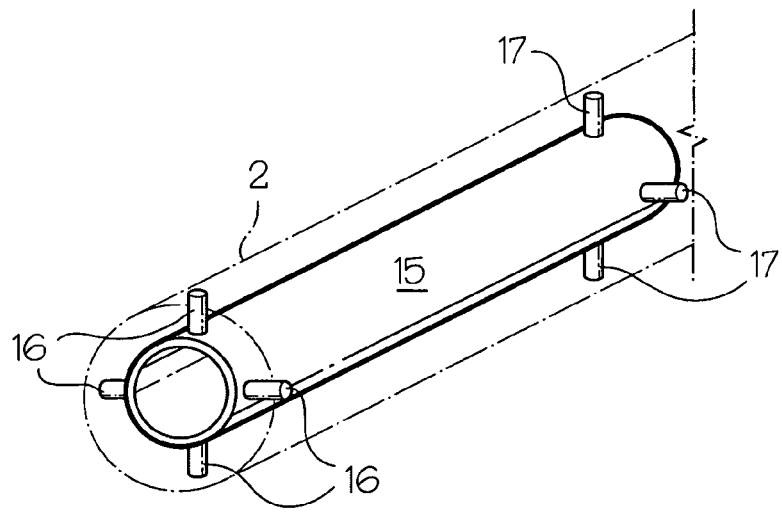
FIG. 5 is an isometric view of the flame tube of FIG. 3.

Alternatively, in a third embodiment of the invention shown in FIGS. 4 and 5, the flame tube 15 is mounted in the center of, i.e. is concentric with, the burner tube 2. Short rods 16 are used to connect the flame tube 15 to the burner tube 2. Other rods 17 at the outlet end of the flame tube 15 help to maintain the tube centered in the burner tube 2.

During normal operation of the radiant heater at a high setting, virtually all of the air from the blower 6 mixes with the fuel to produce a flame 13. When the supply of fuel to the burner 9 is reduced, it is not necessary to reduce the flow of air into the chamber 4 from the blower 6. Excess air, i.e. air not required for complete combustion of the fuel flows around the flame tube 15 and is heated before mixing with the combustion gases downstream of the flame tube. Thus, it is merely necessary to reduce the fuel supply while maintaining a constant flow of air into the chamber 4.

The invention claimed is:

1. A radiant tube heater comprising a housing; an opening in one end of said housing; a burner tube extending outwardly from said housing around said opening; a burner in said housing spaced apart from said opening; a gas inlet extending into said housing and connected to said burner for introducing fuel into said burner; a blower in said housing for introducing combustion air into the housing for mixing with the fuel and for blowing a flame and the products of combustion out of the housing into said burner tube; and a flame tube in said burner tube for receiving the flame, the flame tube extending a short distance from the opening into the burner tube whereby air required for efficient combustion of the gases passes between the burner and the opening to create the flame, which is blown through the opening and then through the flame tube, and excess air exiting the housing through the opening passes between the burner tube and the flame tube for heating by the flame tube.

2. The radiant tube heater of claim 1, wherein said flame tube is attached to one side of the burner tube.

3. The radiant tube heater of claim 2, wherein said flame tube extends along the bottom of the burner tube.

4. The radiant tube heater of claim 1, wherein said flame tube is centered in said burner tube, whereby excess air passes completely around the flame tube.

5. The radiant tube heater of claim 4 including a plurality of rods extending radially between said burner tube and said flame tube for centering and supporting the flame tube in the burner tube.

* * * * *